US012561898B1

(12) United States Patent  (10) Patent No.: US 12,561,898 B1

Bakalash  (45) Date of Patent: Feb. 24, 2026

(54) RASTER GRAPHICS REAL-TIME MIRRORING

(71) Applicant: Reuven Bakalash, Shdema (IL)

(72) Inventor: Reuven Bakalash, Shdema (IL)

( * ) Notice: Subject to any disclaimer, the term of this patent is extended or adjusted under 35 U.S.C. 154(b) by 7 days.

(21) Appl. No.: 19/239,000

(22) Filed: Jun. 16, 2025

(51) Int. Cl.
| | |
|---|---|
| *G06T 1/20* | (2006.01) |
| *G06T 15/20* | (2011.01) |
| *G06T 15/30* | (2011.01) |
| *G06T 15/50* | (2011.01) |
| *G06T 17/20* | (2006.01) |

(52) U.S. Cl.
CPC .............. *G06T 15/506* (2013.01); *G06T 1/20* (2013.01); *G06T 15/20* (2013.01); *G06T 15/30* (2013.01); *G06T 17/20* (2013.01)

(58) Field of Classification Search
CPC ........... G06T 1/20; G06T 15/20; G06T 15/30; G06T 15/506; G06T 17/20
USPC ......................................................... 345/506
See application file for complete search history.

(56) References Cited

U.S. PATENT DOCUMENTS

| | | | |
|---|---|---|---|
| 8,872,827 | B2 | 10/2014 | Hart |
| 9,007,372 | B2 | 4/2015 | Bakalash |
| 9,117,306 | B2 | 8/2015 | Bakalash |
| 9,633,467 | B2 | 4/2017 | Bakalash |
| 9,805,497 | B2 | 10/2017 | Bakalash |
| 10,395,416 | B2 | 8/2019 | Bakalash |
| 10,614,612 | B2 | 4/2020 | Bakalash et al. |

| | | | |
|---|---|---|---|
| 10,699,468 | B2 | 6/2020 | Bakalash et al. |
| 10,818,072 | B2 | 10/2020 | Bakalash et al. |
| 10,930,053 | B2 | 2/2021 | Bakalash et al. |
| 11,010,957 | B1 | 5/2021 | Bakalash et al. |
| 11,017,582 | B2 | 5/2021 | Bakalash et al. |
| 11,120,610 | B2 | 9/2021 | Bakalash et al. |
| 11,756,255 | B2 * | 9/2023 | Bakalash ................ G06T 13/40 345/426 |
| 12,137,289 | B1 | 11/2024 | Kim |
| 12,167,034 | B2 | 12/2024 | Salmon-Legagneur et al. |
| 12,167,035 | B2 | 12/2024 | Xiu et al. |
| 2006/0132495 | A1 * | 6/2006 | Anderson ............. G06T 11/203 345/581 |
| 2007/0257911 | A1 | 11/2007 | Bavoil et al. |
| 2008/0074416 | A1 | 3/2008 | Brown et al. |
| 2017/0094262 | A1 | 3/2017 | Peterson et al. |
| 2017/0372508 | A1 | 12/2017 | Schoeneman |
| 2024/0354889 | A1 | 10/2024 | Boyce et al. |
| 2025/0144531 | A1 | 5/2025 | Bakalash |

OTHER PUBLICATIONS

Anton Gerdelan Cube Maps: Sky Boxes and Environment Mapping, Oct. 2, 2016 (15 pages).
Nealen, Andrew Shadow Mapping and Shadow Volumes: Recent Developments in Real-Time Shadow Rendering, University of British Columbia, 2002. (7 pages).
Celarek Adam, Merging Ray Tracing and Rasterization in Mixed Reality, Computer graphics, Projects 2013 (2 pages).

* cited by examiner

*Primary Examiner* — Jacinta M Crawford

(74) *Attorney, Agent, or Firm* — May Patents Ltd.

(57) ABSTRACT

A raster-based method for generating non-planar reflections in real-time. The method is based on projecting each time all visible object's polygons on a single polygon of a non-planar reflecting surface. All the projections are transformed to camera view and moved through the raster pipeline creating a complete, mirrored image.

8 Claims, 12 Drawing Sheets

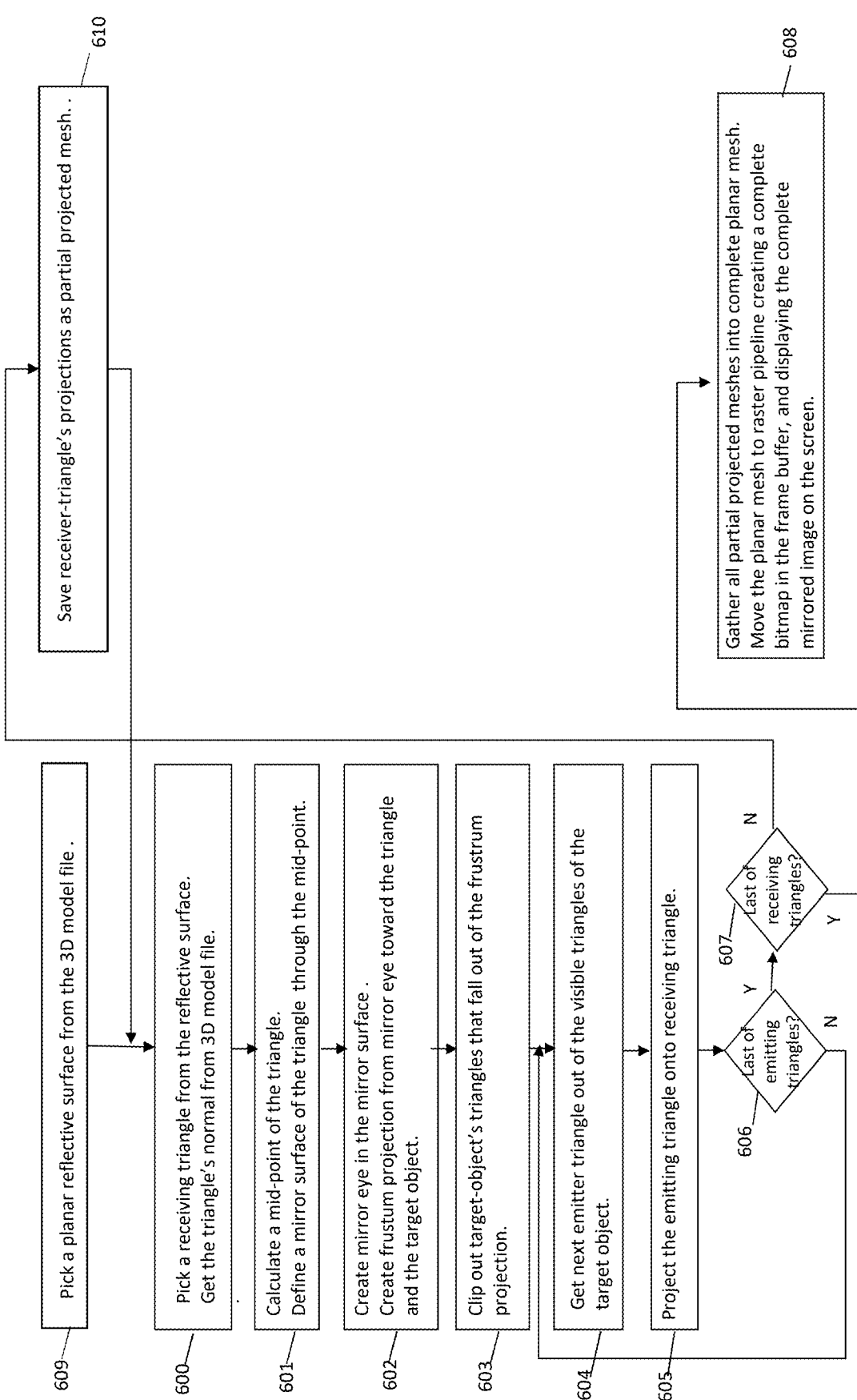

Fig. 6. Planar reflections flowchart

609 Pick a planar reflective surface from the 3D model file .

600 Pick a receiving triangle from the reflective surface.
Get the triangle's normal from 3D model file.

601 Calculate a mid-point of the triangle.
Define a mirror surface of the triangle through the mid-point.

602 Create mirror eye in the mirror surface .
Create frustum projection from mirror eye toward the triangle and the target object.

603 Clip out target-object's triangles that fall out of the frustrum projection.

604 Get next emitter triangle out of the visible triangles of the target object.

605 Project the emitting triangle onto receiving triangle.

606 Last of emitting triangles?
Y
N

607 Last of receiving triangles?
N
Y

610 Save receiver-triangle's projections as partial projected mesh. .

608 Gather all partial projected meshes into complete planar mesh. Move the planar mesh to raster pipeline creating a complete bitmap in the frame buffer, and displaying the complete mirrored image on the screen.

Fig. 11. Nonplanar reflections flowchart

RASTER GRAPHICS REAL-TIME MIRRORING

FIELD OF THE DISCLOSURE

The present invention teaches method and system for real-time generation of reflected images in raster graphics, for non-planar and planar surfaces.

BACKGROUND

Reflections (mirroring). In computer graphics, reflections are a technique used to simulate how light bounces off surfaces, creating realistic images in reflective surfaces, like mirrors and shiny objects. Accurate reflections are commonly computed using ray tracing, but not raster graphics. E.g. Bakalash et. al., METHOD for NON-PLANAR SPECULAR REFLECTIONS in HYBRID RAY TRACING, U.S. Pat. No. 10,699,468 and Bakalash et. al., METHOD for PHOTOREALISTIC REFLECTIONS in NON-PLANAR REFLECTIVE SURFACES, U.S. Pat. No. 11,010,957, which are incorporated in their entirety for all purposes as if fully set forth herein. In raster graphics approximate reflections can be computed by using simpler methods such as environment mapping (cubemap). However, since the cubemap is rendered from a single point, not from a large surface, the reflections have increasingly incorrect perspective and occlusion the farther you get from that point.

In general, while mirroring technology on planar surfaces tends to be straightforward, non-planar surfaces introduce complexities that require more sophisticated approaches.

There are two important, even game-changing aspects of real-time mirroring, especially to the field of video gaming. The first is the capability to deliver a maximal experience of bodily self-consciousness, which may give us feedback on who we are and what we are experiencing at the moment. A quick glance in the mirror reaffirms our sense of self. If our facial image replaces the face of a movie character, then on top of his visual reflection one can identify with the hero. The second aspect for games is allowing to explore new and exciting camera angles. A story may be found inside a mirror or car reflection with off-screen objects or animations, while otherwise invisible. They may hint what is happening in hidden parts of the scene to catch danger before time, wherein the gamer needs to make a tactical and strategic decision in a blink of time.

Bodily self-consciousness. The experience of bodily self-consciousness or embodiment comes from the coherent multisensory integration taking place in the brain and relates to the notion of egocentric perspective on the self. In real life, we typically use mirrors and reflective surfaces for the egocentric first-person perspective. They play an important role in our psychological and emotional functioning. Reflections help us develop our sense of self. Researchers infer that if subjects can tell that the image on the reflective surface is in fact them, then they have developed a cognitive sense of self.

In fact, we come to develop a sense of self through early interactions in which our caregivers mirror or imitate our movements and emotional expressions and respond to us in ways that give us feedback that we are separate from them, and that our behaviour creates a reaction in them. It seems that we need a context outside ourselves to self-recognize—other people reflect us as individuals, and mirrors do too. We use the mirror as we do face-to-face communication: to get feedback on who we are and what we are experiencing at the moment. A quick glance in the mirror reaffirms our sense of self. If our facial image replaces the face of a movie character, then on top of his visual reflection one can identify with the hero.

To achieve a maximal experience of embodiment, the brain must be fed by images that are faithful to reality. Cinematographic movies are an important source of photorealistic images of self. However, to generate computer graphics images of self, such as in gaming applications, a new raster-graphics mirroring technology is imperative.

New and exciting camera angles. A real-time mirroring effect in a game allows exploring new and exciting camera angles. A story may be found inside a mirror or car reflection with off-screen objects or animations. They may hint what is happening in hidden parts of the scene (such as behind the gamer) to catch danger before time, wherein the gamer needs to make a tactical and strategic decision in a blink of time.

A story may be found inside a mirror or in car reflection with off screen objects or animations, allowing explore new and exciting camera angles. The reflections may provide new information to the player, such as an enemy behind the player or an enemy hiding behind the car, reflected at an incidental window. Reflections hint what is happening behind you or in hidden parts of the scene to catch danger before time.

This is a new level of gaming taking the gamer's experience a quantum leap upward and upgrading the gaming rules. Certainly, a new level design and game strategy is required. The game designers need to raise the designing level according to the new and unique information provided to the gamer, wherein the gamer needs to make new tactical and strategic decision in a blink of time.

The application aspects of real time reflections are thoroughly described in Bakalash Reuven "Real-Time Ray Traced Virtual Reality Gaming", US publication #2025-0144531, which is incorporated in its entirety for all purposes as if fully set forth herein.

As appropriate, providing real-time reflections in raster graphics technology.

As appropriate, providing real-time reflections in planar surfaces in raster graphics technology.

As appropriate, providing real-time reflections in non-planar surfaces in raster graphics technology.

As appropriate, enabling real-time planar and non-planar reflections in gaming applications.

As appropriate, enabling bodily self-consciousness in gaming applications.

As appropriate, enabling new camera angles in gaming applications.

As appropriate, enabling real-time generation of planar and non-planar reflections on standard graphics pipelines.

As appropriate, utilizing the data of reflective surface and target data which is stored in a 3D model file.

As appropriate, speeding up the generation of planar and non-planar reflections by utilizing a bypass file.

SUMMARY OF THE DISCLOSURE 3D models, stored as files (e.g., OBJ, FBX), are transformed into visible images on a screen through the graphics pipeline. This pipeline comprises a series of steps where GPU (Graphics Processing Unit) follows to convert 3D data into 2D images for display. 3D model files store information about the geometry (shape) of an object, as well as textures, materials, and sometimes even animation data. Models in these files are kept as records within the file.

For computer gaming applications, generating a mirroring effect is of interest mainly in respect to the player's figure or to his avatar, which are mirrored in planar reflective surfaces (such as mirrors), or in nonplanar reflective objects (such as glass vases, shiny automobiles, etc.). While mirroring on planar surfaces is fast due to uniformity of their triangle normals, non-planar surfaces introduce complexities due to normal's uniqueness of each triangle. The reflection of a non-planar surface are breakdown to multiple processes generating partial images, moved one by one through the graphics pipeline, finally gathered in the frame buffer like a puzzle, constituting a complete mirrored reflection of the target object. As opposed, the planar image is reflected in a single process and moved as a whole to the graphics pipeline.

According to an embodiment, the mirroring process of the present invention, planar and non-planar, is performed in a separated pass rendering. In raster graphics, multi-pass rendering involves processing an image in multiple sequential stages or "passes." Each pass applies a specific effect or calculation to the image, and the results of one pass are used as input for the next. This approach allows for complex effects and detailed control over image creation, particularly in situations where a single rendering pass is insufficient or computationally expensive.

BRIEF DESCRIPTION OF THE DRAWINGS

For a better understanding of the embodiments and to show how they may be carried into effect, reference will be made, purely by example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings makes apparent to those skilled in the art how the several selected embodiments may be put into practice.

As used in this specification, the singular indefinite articles "a", "an", and the definite article "the" should be considered to include or otherwise cover both single and plural referents unless the content clearly dictates otherwise. In other words, these articles are applicable to one or more referents. As this specification uses, "or" is generally employed to include or otherwise cover "and/or" unless the content dictates otherwise.

Figure 1:
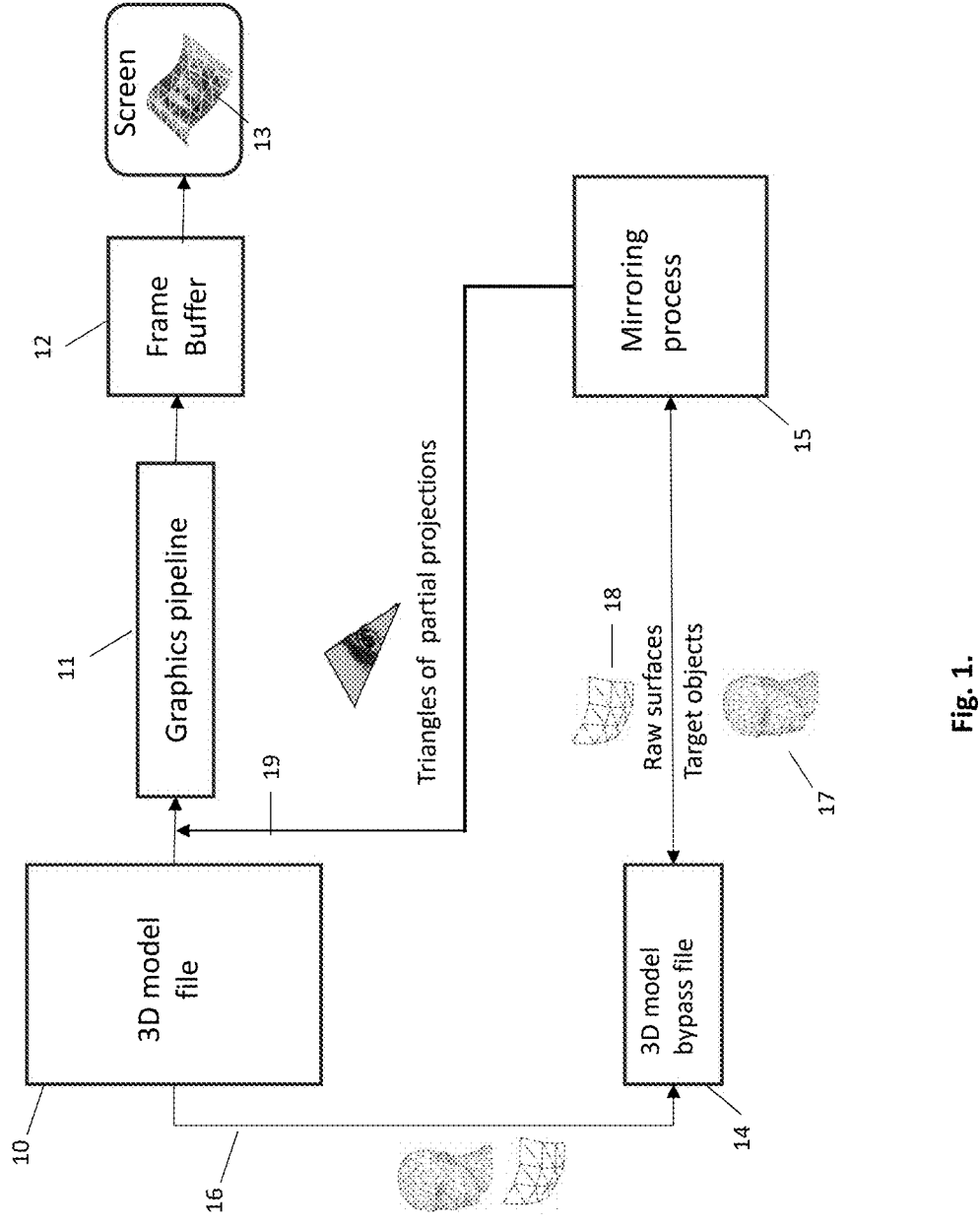
Figure 2:
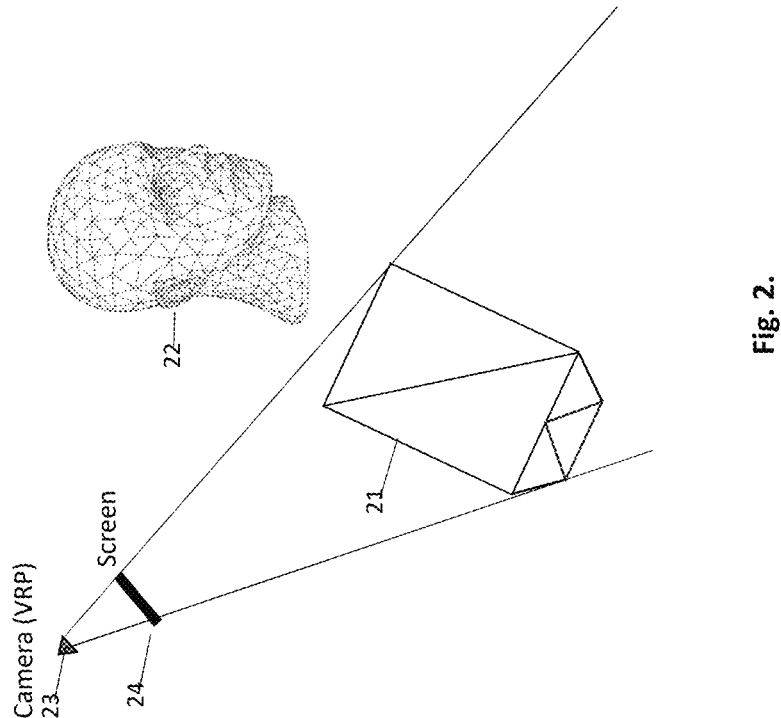
Figure 3:
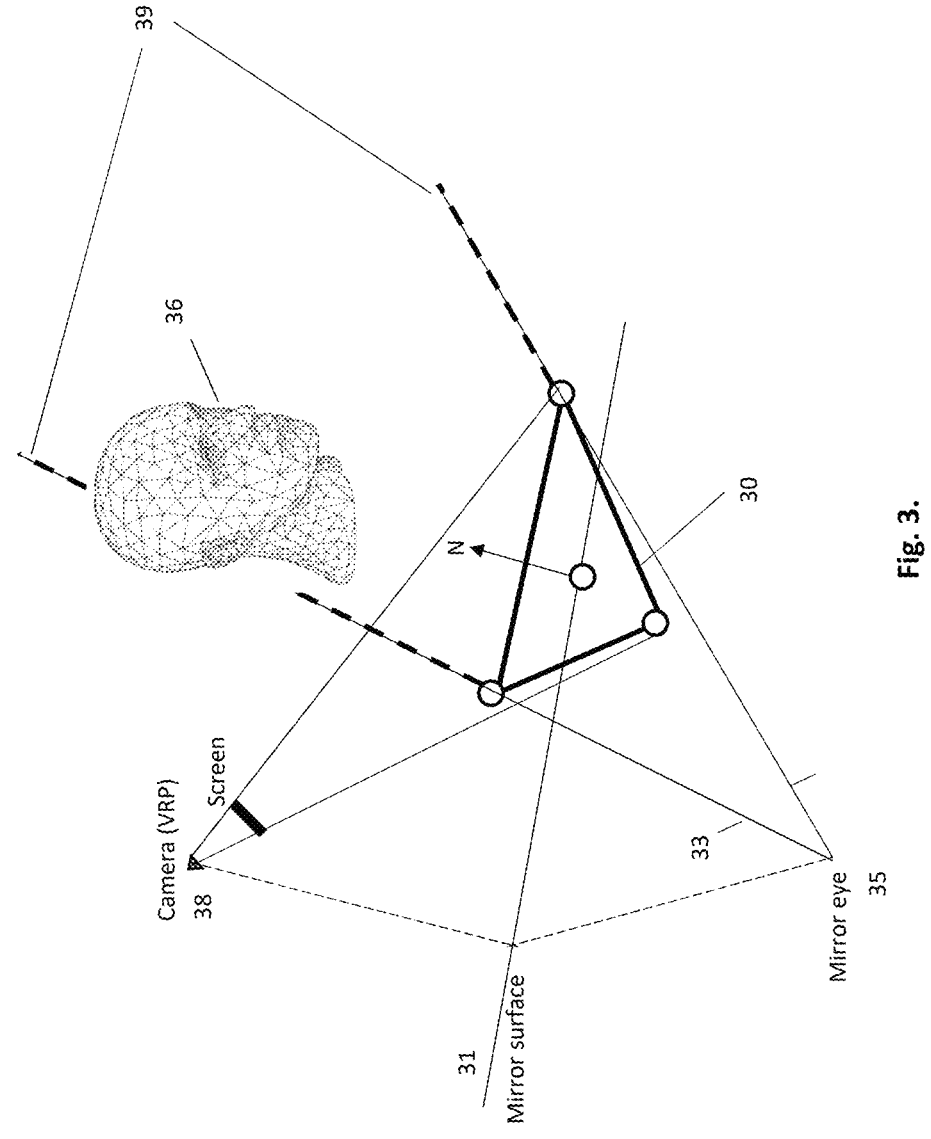
Figure 4:
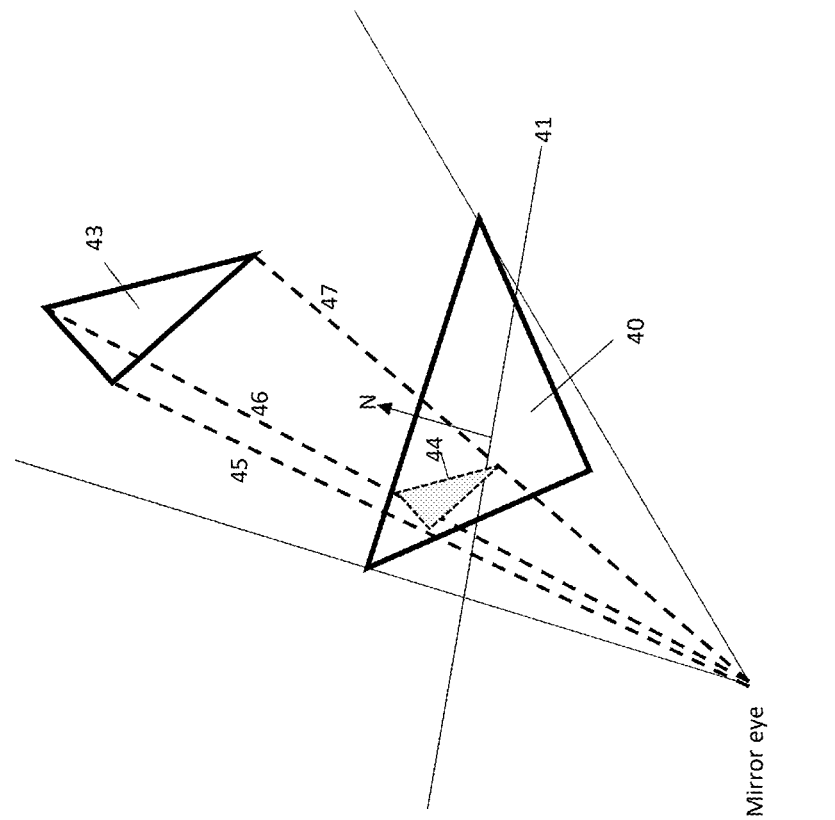
Figure 5:
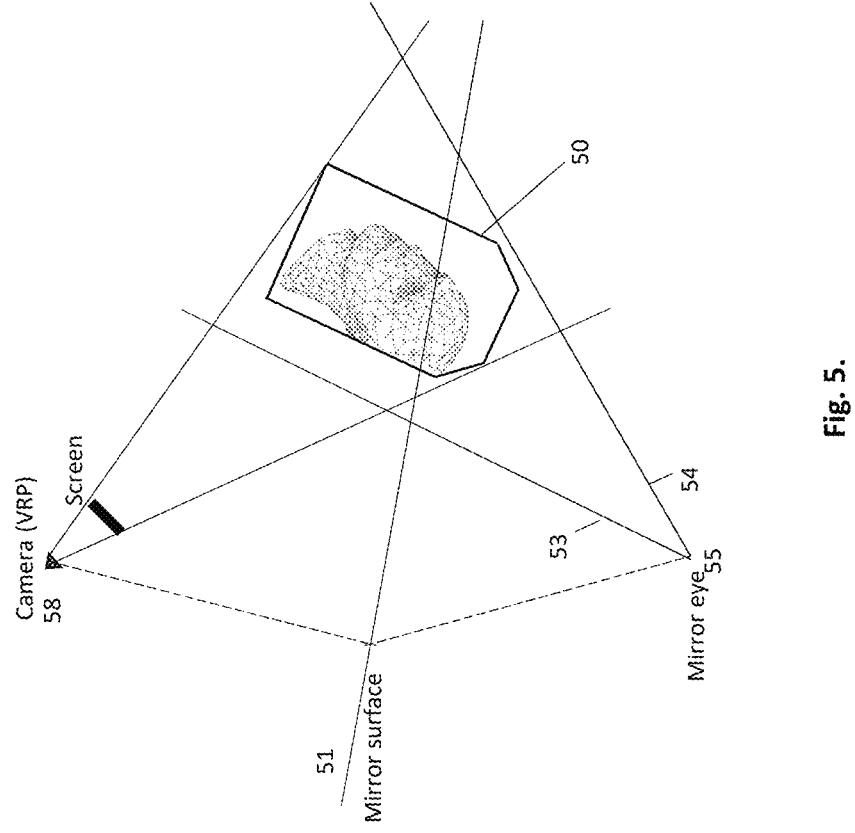
Figure 7:
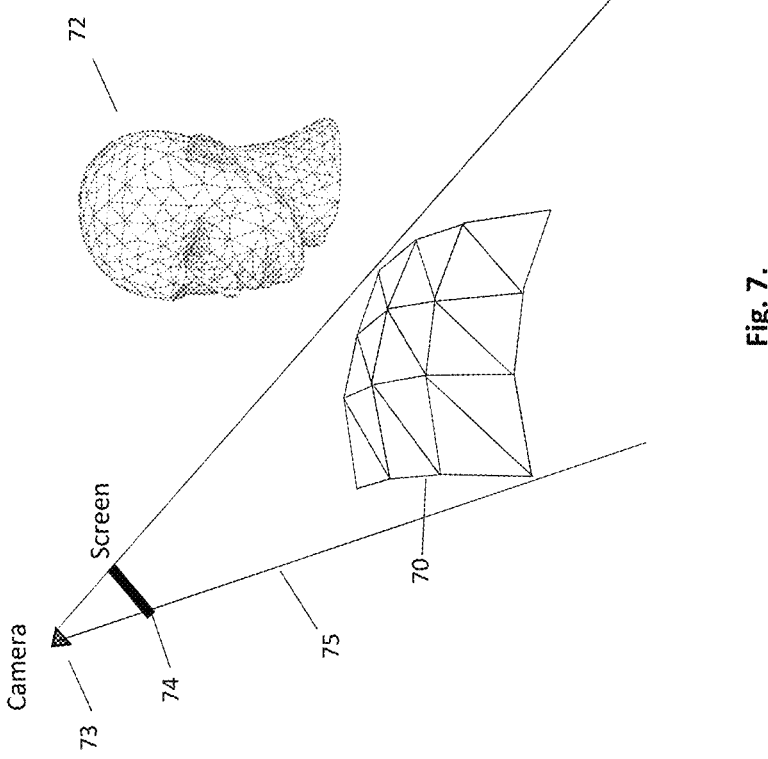
Figure 8:
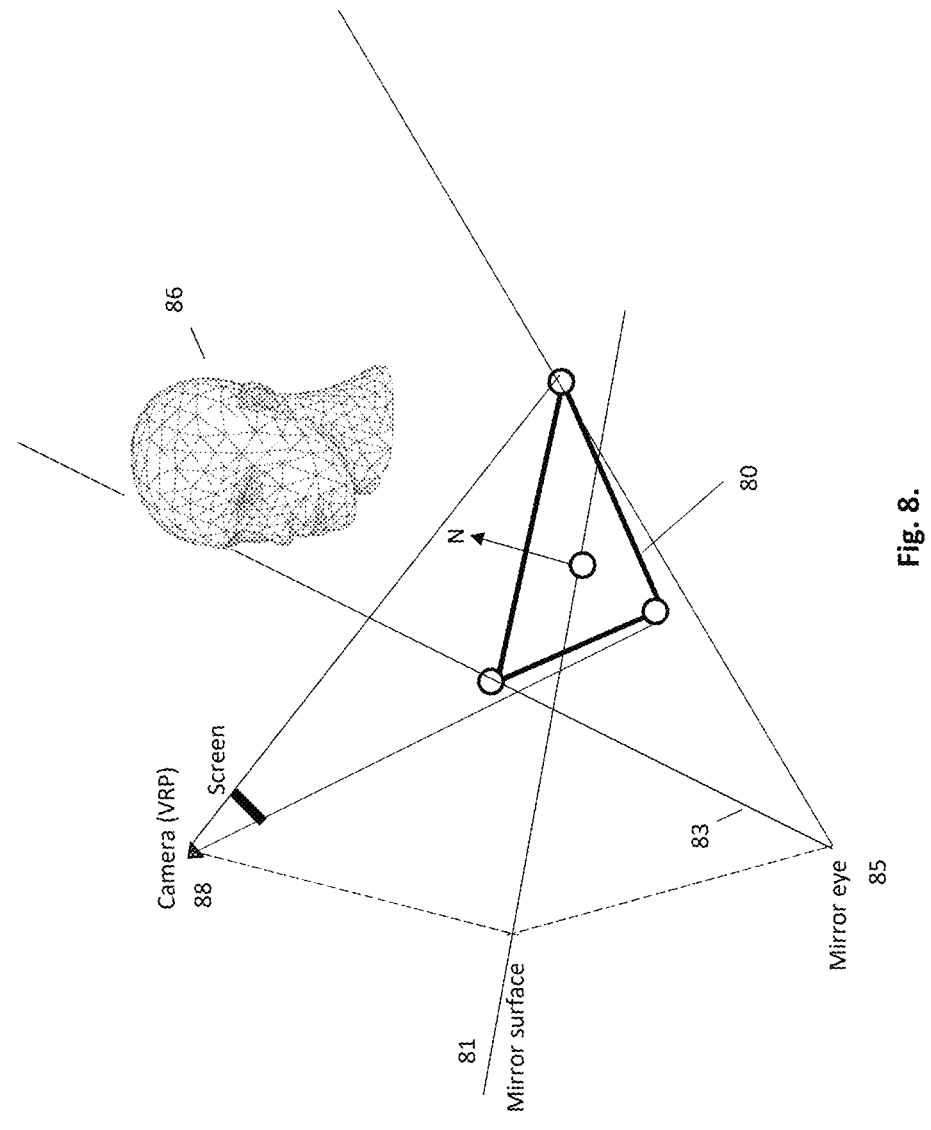
Figure 9:
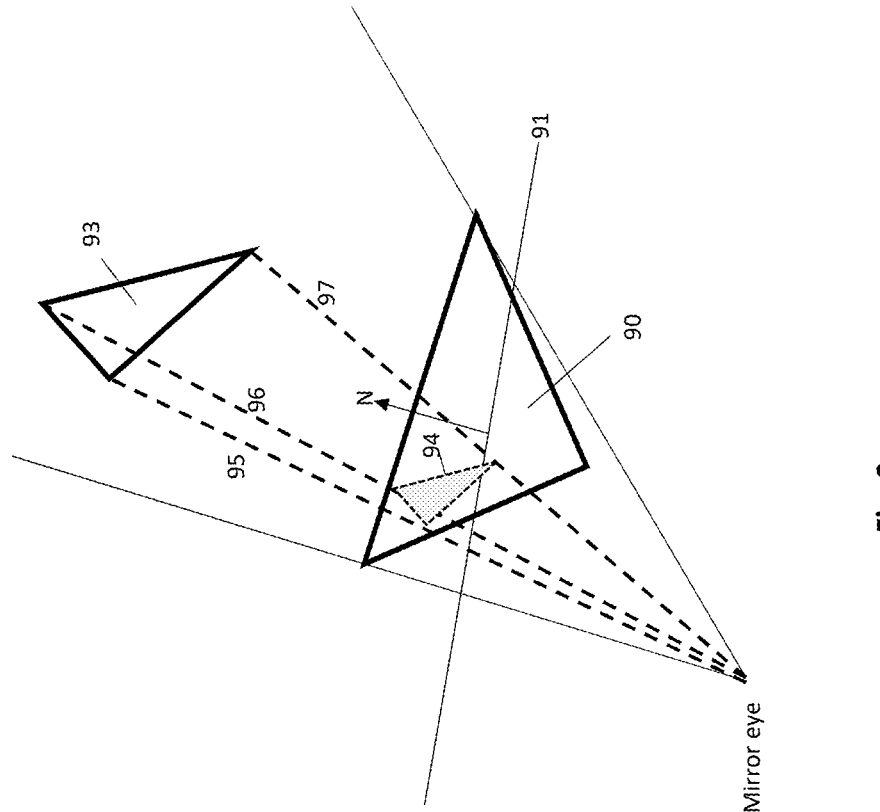
Figure 10:
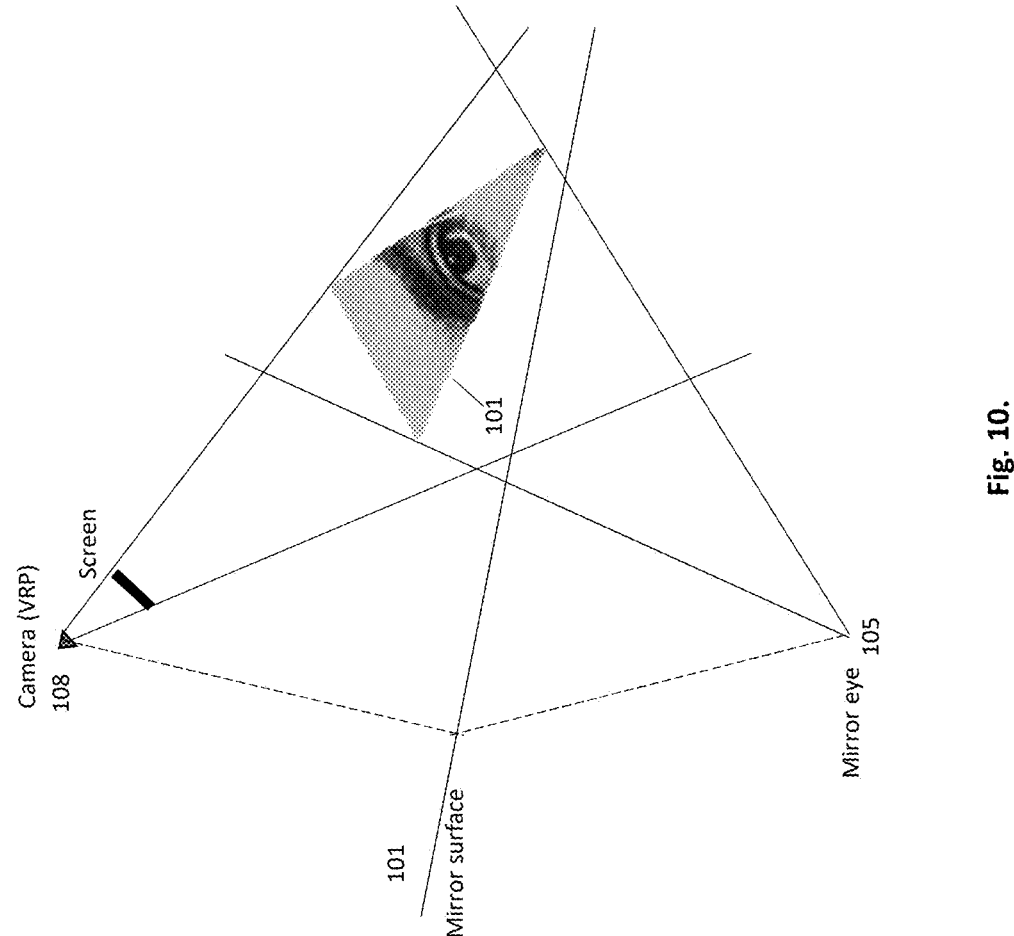
Figure 11:
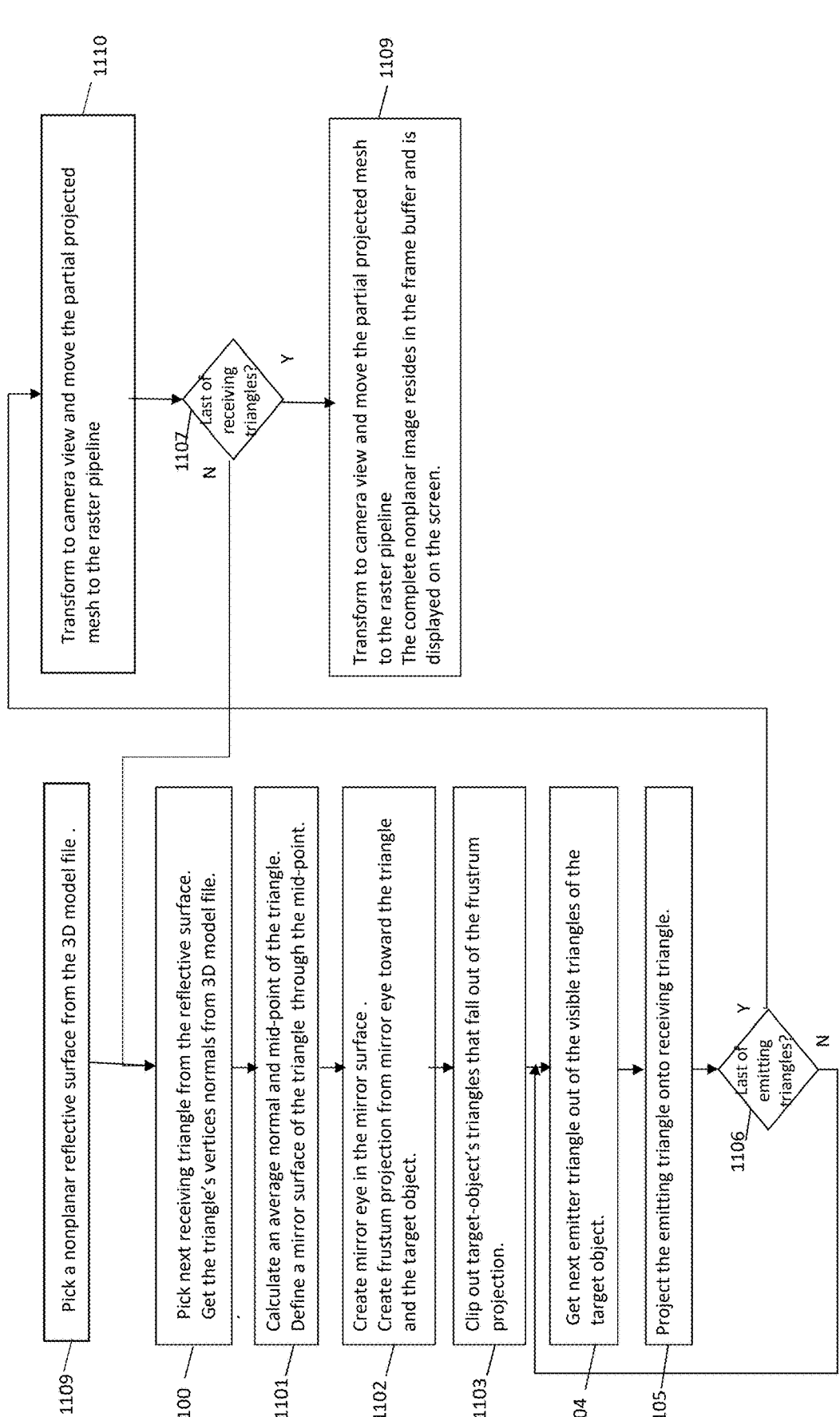
Figure 12:
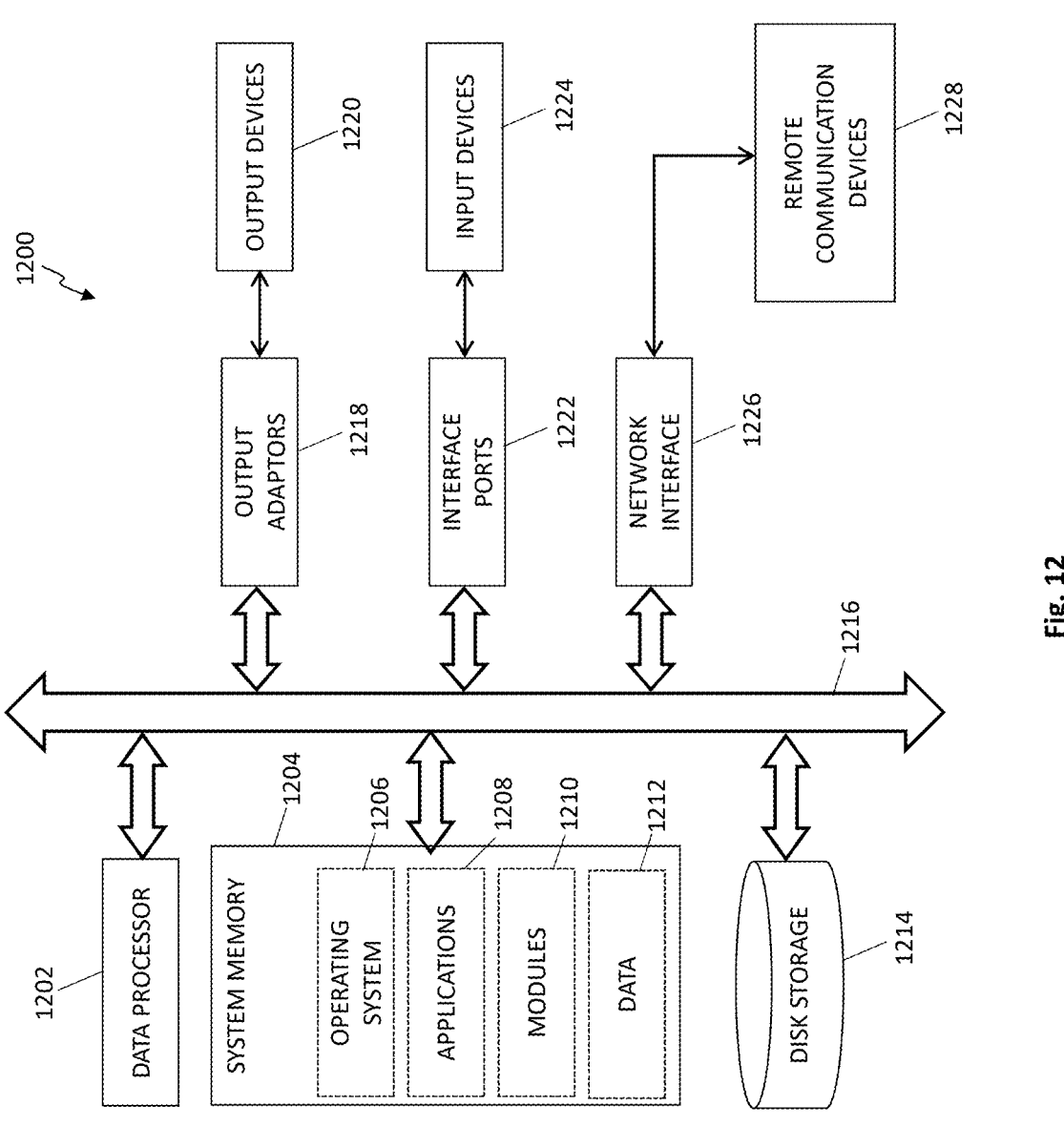

As used in this specification, the term "triangle" may include the term "polygon". In the accompanying drawings:

FIG. 1. illustrates a schematic representation of a raster-based graphics system of real-time mirroring, in accordance with an exemplary embodiment of a present invention;

FIG. 2. illustrates a schematic representation of a planar reflective surface and a target object, viewed from the camera, in accordance with an exemplary embodiment of a present invention;

FIG. 3. illustrates a schematic representation of a transformed view of the planar reflective surface and the target object, both viewed from a mirror eye, in accordance with an exemplary embodiment of a present invention;

FIG. 4. illustrates a schematic representation of a target-object's triangle projected onto planar-surface's polygon, in accordance with an exemplary embodiment of a present invention;

FIG. 5. illustrates a schematic representation of the final mirror image, transformed into camera view, in accordance with an exemplary embodiment of a present invention;

FIG. 6. illustrates a flowchart of the reflecting process in planar surface, in accordance with an exemplary embodiment of a present invention;

FIG. 7. illustrates a schematic representation of a non-planar reflective surface and a target object, viewed from the camera, in accordance with an exemplary embodiment of a present invention;

FIG. 8. illustrates a schematic representation of a transformed view of the non-planar reflective surface and the target object, both viewed from a mirror eye, in accordance with an exemplary embodiment of a present invention;

FIG. 9. illustrates a schematic representation of a target-object's polygon projected onto non-planar-surface's polygon, in accordance with an exemplary embodiment of a present invention;

FIG. 10. illustrates a schematic representation of a polygon mirror image, transformed into camera view, in accordance with an exemplary embodiment of a present invention;

FIG. 11. illustrates a flowchart of the reflecting process in a non-planar surface, in accordance with an exemplary embodiment of a present invention;

FIG. 12. Illustrates a block diagram of an exemplary system for implementing various aspects of the invention.

DETAILED DESCRIPTION OF THE DISCLOSURE

To generate a real time mirroring in raster graphics, a fast access to geometry and materials data is imperative. Particularly for large and complex models such as human figures.

According to one embodiment, In the present disclosure a retrieval of target models and reflective surfaces is accelerated due to utilization of designated bypass file. This is a small and fast-accessible file containing designated target objects and mirror surfaces. To generate a real time mirroring effect in raster graphics, a fast and randomly access to geometry and materials in 3D file is imperative. Particularly for large and complex models such as human figures.

As illustrated in FIG. 1, a raster-based computer graphics comprises a 3D model file 10, feeding 3D models into graphics pipeline 11 for transformation into visible images, stored as a pixel bitmap in a frame buffer 12, of which images are generated on screen 13. The screen is being refreshed tens of times per second (typically 60 fps) to allow smooth motion of images.

The real-time mirroring 15 is applied on target objects 17 creating their mirrored images on reflective surfaces 18, planar or nonplanar. The target objects may consist of polygon meshes counting hundreds of thousand of polygons. According to the mirroring algorithm, as explained hereinafter, almost all the target polygons must be projected in every of the surface's polygon. This may result in millions of polygon-projections. Therefore, fast retrieval of target models for real-time mirroring is critical.

In an embodiment, a retrieval of target models is accelerated utilizing a bypass file 14. This is a small and fast accessible file containing designated target objects and mirror surfaces. The data of raw mirroring surfaces 18 and relevant target objects 17 are copied in advance from the 3D model file 10 to the bypass file, then accessed by the mirroring process 15, whenever required. Finally, the out-come of the process, surfaces with projected triangles, are moved to the graphics pipeline 19.

According to an embodiment, the mirroring process of the present invention is performed in a separated rendering pass.

According to one embodiment a planar reflective surface is processed to reflect a target object. As shown in FIG. 2, surface 21 and object 22, are termed receiver and emitter, accordingly. The camera 23 serves as a View Reference Point (VRP) defining viewing position and frustrum for the projection. Both, the surface and the target object, are stored in a 3D model file that describes the position of each vertex (or point) in a 3D object. The model file contains the essential data for defining the geometry, including vertex coordinates, texture coordinates, normals, color, light, material, texture, and transparency. The 3D model file is processed by graphics pipeline for display, wherein the result is stored in a frame buffer. The framebuffer is a portion of memory that stores the pixel data of a video frame, effectively creating a bitmap representation of the image displayed on screen 24.

Each receiver's polygon of the planar surface 21 is handled separately for projection of emitting triangles, generating a partial result of receiver triangle projected mesh. A final gathering of the partial results becomes an aggregated planar surface reflection.

As shown in FIG. 3, the camera 38 marks a View Reference Point (VRP) defining the viewing position of the projection. Triangle 30 is one of the receiving triangles of the reflective surface. The target object 36 consists of meshes of emitting triangles. To calculate a correct reflection in the receiving triangle, its normal is required. The vertex normals are known from the 3D model file. Fortunately, as far as we deal with planar surfaces, the normals of all the vertices of a triangle are the same. Moreover, all receiving triangles of the surface share the same normal.

Once the triangle's normal is given, a mirror surface 31, perpendicular to the normal and through the mid-point of the triangle, is obtained. Then a mirror eye 35, which is the camera reflection in the mirror surface, is calculated. The mirror eye serves as an origin of a frustum projection. The frustrum is shaped by the receiver's triangle 30 and directed toward the target object 36. The frustum defines the scene visibility from the triangle. In the example of FIG. 3 the target object 36 is only partly visible. Thus, portion of its triangle mesh of 36 is being clipped.

Reflection is generated by projecting all visible emitting triangles of the target object 36 in a receiving triangle, resulting in a partial result, a partial projected mesh. This is repeated for all receiving triangles of the planar reflective surface. Each such receiving triangle is processed separately for a partial projected mesh. Upon all triangles of the reflective surface are done, all partial meshes are gathered into final aggregated projected mesh. As illustrated in FIG. 4, a reflection 44 (of the emitting triangle 43) in the receiver 40, is shown. As mentioned above, the task of reflecting an emitting triangle onto receiving triangle applies only to the visible triangles of the object mesh. The frustum visibility test identifies the emitting candidates for reflection, whereas triangles that are not visible to the receiving triangle are clipped.

If the emitter triangle 43 passes the visibility test, it is projected onto receiver's surface by its three vertices 45, 46, 47, and sampled for color, light, material, texture, transparency, etc., achieved from the 3D model file. Once all visible emitter triangles have been projected onto receiver triangle 40, another receiver triangle is taken. A mirror surface through the mid-point of the new triangle is obtained, and a new mirror eye is defined. Mirror eyes of the different receiver triangles have different locations and different frustrum opening, but share a common mirror surface, because all triangles belong to the same planar surface. Upon completing all receiver triangles, their partial projected meshes are aggregated into complete planar mesh, as shown in FIG. 5. The aggregated mesh is transformed from mirror eye view to camera view and moved to the raster pipeline. As a result, the planar surface with the projected target object is rasterized, stored in frame buffer, and transformed into visible mirrored on the screen.

FIG. 6 summarizes the mirroring procedure of objects in a planar-reflective surface. When compiling the 3D model file, all the reflective planar surfaces to be used as mirrors must be specifically marked. One of those planar surfaces is picked 609 for mirroring. The first receiving triangle from the planar reflective surface is taken for reflection 600, and its normal is obtained from the 3D model file. The mid-point of the triangle is calculated, as well its mirror surface through the mid-point 601. A mirror eye, which is the camera reflection in the mirror surface, is defined, and a frustrum is shaped toward the receiver's triangle and target object 602. Target-object's triangles that fall out of the frustrum projection are clipped out 603. The first emitter triangle, of the visible mesh of the target object, is taken for projection in current receiver triangle 604. This partial projection is saved for a later aggregation. The receiver triangle is projected 605, and the next triangle is taken, unless all the mesh triangles are done 606. When the receiver triangle is done with all emitting triangles, the next receiver triangle is taken, unless it is the last receiver triangle of the planar surface 607. Finally, all the partial projections on all receiver triangles, are gathered as a complete aggregated planar surface, creating a planar mesh-record, and moved to the raster-pipeline 608. As a result, a planar reflection of the target object appears on the screen as a mirrored image within a planar reflecting surface, e.g. human face in a home mirror.

According to another embodiment a nonplanar reflective surface is processed to reflect a target object. As shown in FIG. 7 there is a surface 70 and a target object 72, receiver and emitter, accordingly. The camera 73 marks a View Reference Point (VRP) defining viewing position and frustrum for the projection. Both, the surface and the target object, are stored in a 3D model file that describes the position of each vertex (or point) in a 3D object. The model file contains the essential data for defining the geometry, including vertex coordinates, texture coordinates, normals, color, light, material, texture, and transparency. The 3D model file is processed by graphics pipeline for display, wherein the rastered result is stored in a frame buffer. The framebuffer is a portion of memory that stores the pixel data of a video frame, effectively creating a bitmap representation of the image displayed on screen 74.

Each non-planar surface's triangle, having a calculated unique normal, is handled separately, up to the frame buffer. Its partial projected mesh is treated as a planar surface. As soon as the projection of all visible emitting triangles in a receiver triangle is completed, it is moved to the raster pipeline. In other words, for nonplanar surfaces the mirroring is done on a triangle level, as opposed to planar surfaces where the mirroring is done on an aggregated level.

As shown in FIG. 8, the camera 88 marks a View Reference Point (VRP), defining the viewing position and the frustrum for the projection. Triangle 80 is one of the receiver triangles of the reflective nonplanar surface. The target object 86 consists of a mesh of emitting triangles. To calculate a correct reflection in the receiving triangle, the triangle's normal is required. A receiver triangle's normal is evaluated based on the normals of its three vertices. Each such vertex is shared with neighbouring triangles, therefore, due to nonplanarity, each vertex has its own normal direction. A triangle's normal direction N is calculated by averaging the normal directions of its three vertices, known from the 3D model file.

Once the triangle's normal is known, a mirror surface 81 through the mid-point of the triangle is obtained. The mirror surface 81 is congruent with the receiver triangle. Then a mirror eye 85, which is the camera reflection in the mirror surface, is defined. The mirror eye serves as an origin of a frustum projection. The frustrum is shaped by the receiver's triangle 80 and directed toward the target object 86. The frustum defines the scene visibility from the triangle. In the example of FIG. 8 the target object 86 is only partly visible. Thus, part of its triangle mesh must be clipped. All the visible triangles of the target object 86 are going to be projected on this triangle, which further will be treated as a separate planar reflection, up to the frame buffer. It will finally comprise a piece of the final mirrored image of the target object. The pieces of all receiver triangles will be gathered at the frame buffer.

As illustrated in FIG. 9, a reflection 94 (of the emitting triangle 93) in the receiver 90, is shown. As mentioned above, the task of reflecting an emitting triangle onto receiving triangle applies only to the visible triangles of the object mesh. The frustum visibility test identifies the emitting candidates for reflection, whereas triangles that are not, or only partly, visible to the receiving triangle, are clipped.

Once an emitter triangle 93 passes the visibility test, it is handled for reflection: projected onto receiver triangle by its three vertices 95, 96, 97 and queried at the 3D model file for color, light, material, texture, and transparency.

Upon completing the projection of all relevant emitter triangles, the receiver-triangle's surface, holds a partially projected mesh, FIG. 10, 101. Next, this mesh is transformed from the view of mirror eye 105 to the camera view 108. Then the receiver triangle with transformed image, along with color, light, material and texture, is moved to the graphics pipeline and rasterized into frame buffer. This procedure repeats for all receiver triangles. Due to the unique normal of each receiver triangle, there is no way to aggregate all partial images in an earlier stage, but in the frame buffer. Therefore, for nonplanar surfaces the transfer to graphics pipeline is done on a triangle level, as opposed to planar surfaces where the update is done on an aggregated level.

FIG. 11 summarizes the mirroring of objects in a nonplanar-reflective surface. When compiling the 3D model file, all the reflective planar surfaces, to be used as mirrors, must be specifically marked. Accordingly to one embodiment all marked objects and non-planar surfaces are moved to the 3D model bypass file (FIG. 1, 14). One of those planar surfaces is picked 1109 for mirroring a target object. The first receiving triangle from the nonplanar reflective surface is taken 1100. Its normal is evaluated based on its three vertices' normals. Each such vertex is shared with neighbouring triangles, therefore, due to nonplanarity, each vertex has its own normal direction. A triangle's normal direction N is calculated by averaging the normal directions of its three vertices, known from the 3D model file 1101.

Once the triangle's normal is known, a mirror surface through the mid-point of the triangle is obtained 1102. Then a mirror eye is defined. The mirror eye serves as an origin of a frustum projection.

Target-object's triangles that fall out of the frustrum projection are clipped out 1103. An emitter triangle, out of the visible mesh of the target object, is taken for projection in current receiver triangle 1104. It is projected 1105, and the next triangle is taken unless all the target object triangles are done at 1106. When the receiver triangle is done with projections of all visible emitting polygons, it is transformed from mirror-eye view to camera view and the partial projected mesh is moved to the raster pipeline 1110, "waiting" for other partial meshes. The next in-line receiver's polygon is taken, unless it has been the last one of the planar surface 1107. In such a case, the receiver triangle is transformed to camera view and moved to the raster pipeline. In this stage the complete nonplanar image resides in frame buffer and is displayed on the screen 1109.

The partial projected meshes of the nonplanar surface are moved one by one to the graphics pipeline, rasterized in a queue, constituting a final mirrored reflection of the target object 1109 on the screen.

FIG. 12 illustrates an exemplary system 1200 for implementing various aspects of the invention. System 1200 includes a data processor 1202, a system memory 1204, and a system bus 1216. The system bus 1216 couples the system components including, but not limited to, the system memory 1204 to the data processor 1202. The data processor 1202 can include one or more of any of the various available processors. The data processor 1202 refers to any integrated circuit or other electronic devices (or collection of devices) capable of operating on at least one instruction, including, without limitation, Reduced Instruction Set Core (RISC) processors, CISC microprocessors, Microcontroller Units (MCUs), CISC-based Central Processing Units (CPUs), Digital Signal Processors (DSPs), Graphics processing unit (GPU), and General-purpose graphics processing unit (GPGPU). Furthermore, various functional aspects of the data processor 1202 may be implemented solely as software or firmware associated with the processor. Dual microprocessors and other multiprocessor architectures also can be employed as the data processor 1202.

The system bus 1216 can be any of several types of bus structure(s) including the memory bus or memory controller, a peripheral bus or external bus, and/or a local bus using any variety of available bus architectures known to those of ordinary skill in the art. The system memory 1204 may include computer-readable storage media comprising volatile memory and nonvolatile memory. The non-volatile memory stores the basic input/output system (BIOS), containing the basic routines to transfer information between elements within the system 1200. Nonvolatile memory can include but is not limited to, read-only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (SDRAM), SynchLink™ DRAM (SLDRAM), Rambus® direct RAM (RDRAM), direct Rambus® dynamic RAM (DRDRAM), and Rambus® dynamic RAM (RDRAM).

The system memory 1204 includes an operating system 1206 which performs the functionality of managing the system 1200 resources, establishing user interfaces, and executing and providing services for applications software. System applications 1208, modules 1210, and data 1212 provide various functionalities to system 1200.

System 1200 also includes disk storage 1214. Disk storage 1214 includes, but is not limited to, devices like a magnetic disk drive, floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

A user enters commands or information into system 1200 through input device(s) 1224. Input devices 1224 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input device 1224 connects to the data processor 1202 through the system bus 1216 via interface port(s) 1222. Interface port(s) 1222 include, for example, a serial port, a parallel port, a game port, and a universal serial bus (USB).

The output devices 1220 like monitors, speakers, and printers are used to provide the output of the data processor 1202 to the user. Another example is a USB port that may be used as an input device 1224 to provide input to system 1200 and output information from system 1200 to output device 1220. The output device 1220 connects to the data processor 1202 through the system bus 1216 via output adaptor 1218. The output adapters 1232 may include, for example, video and sound cards that provide a means of connection between the output device 1220 and the system bus 1216.

System 1200 can communicate with remote communication devices 1228 for exchanging information. The remote communication device 1228 can be a personal computer, a server, a router, a network PC, a workstation, a microprocessor-based appliance, a mobile phone, a peer device, or another common network node and the like.

Network interface 1226 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The invention claimed is:

1. A raster-based method, solely implemented by conventional raster graphics means with no reliance on ray tracing algorithms, for generating a mirrored image of target objects, composed of emitting polygons, in a non-planar reflective surface of receiving polygons, the method comprising the following steps of:

projecting on a receiving polygon of the receiving polygons all visible emitting polygons that are visible from the receiving polygon, for creating a partial projected mesh on the receiving polygon, wherein all receiving and emitting polygons are taken from a bypass file;

transforming the partial projected mesh from a mirror eye view to a camera view;

moving the partial projected mesh to a graphics pipeline, creating a partial bitmap in a frame buffer;

repeating the projecting, transforming and moving the partial projected mesh for additional receiving polygons through the graphics pipeline, wherein each receiving polygon is processed separately and successively;

aggregating a complete bitmap image in the frame buffer, out of the successively transformed partial projected meshes; and displaying the complete bitmap image on a screen as a mirrored image of the target objects.

2. The method of claim 1, wherein the partial projected mesh of a receiving polygon is moved to the graphics pipeline, along with colour, light, material and texture data.

3. The method of claim 1, wherein the partial projected mesh is rasterized by the graphics pipeline into the frame buffer, creating a partial bitmap representation of the displayed image on the screen.

4. The method of claim 1, wherein the complete bitmap mirrored image on the screen is created of partial bitmaps of receiving polygons, aggregated into the complete bitmap image in the frame buffer, for a mirrored image of a target object displayed on the screen.

5. A raster graphics system, solely implemented by conventional raster graphics means with no reliance on ray tracing algorithms, capable of generating a non-planar mirrored image of target objects, composed of emitting polygons, in a non-planar reflective surface of receiving polygons, the raster graphics system comprising:

a conventional raster graphics rendering pipeline, without ray tracing constituents;

a frame buffer;

at least one screen;

at least one general purpose processor; and a bypass file with:

at least one model of a non-planar reflecting surface composed of the receiving polygons; and at least one model of a target object composed of emitting polygons; wherein in runtime, projecting on a receiving polygon of the receiving polygons all emitting polygons that are visible from the receiving polygon, for creating a partial projected mesh on the receiving polygon, wherein all receiving and emitting polygons are taken from a bypass file;

transforming the partial projected mesh from a mirror eye view to a camera view;

moving the partial projected mesh to the graphics pipeline, creating a partial bitmap in a frame buffer;

repeating the projecting, transforming and moving for additional receiving polygons, wherein each receiving polygon is done successively, through the graphics pipeline;

aggregating a complete bitmap image, out of the separately and successively transformed partial projected meshes, in the frame buffer, and displaying the complete bitmap image on the screen as a mirrored image of the target objects.

6. The system of claim 5, wherein the partial projected mesh of a receiving polygon is moved to the graphics pipeline, along with colour, light, material and texture data.

7. The system of claim 6, wherein the partial projected mesh is rasterized by the graphics pipeline into the frame buffer, creating a partial bitmap representation of the displayed image on the screen.

8. The system of claim 5, wherein the complete bitmap mirrored image on the screen is created of partial bitmaps of receiving polygons, aggregated into the complete bitmap image in the frame buffer, for a mirrored image of a target object displayed on the screen.

* * * * *